US011333520B2

(12) United States Patent
Pandit et al.

(10) Patent No.: US 11,333,520 B2
(45) Date of Patent: May 17, 2022

(54) VISUALLY GUIDING A VEHICLE (71) Applicant: International Business Machines Corporation, Armonk, NY (US)

(72) Inventors: Sushain Pandit, Austin, TX (US); Smitkumar Narotambhai Marvaniya, Bangalore (IN); Vijay Ekambaram, Chennai (IN); Kovit Nisar, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 16/438,518

(22) Filed: Jun. 12, 2019

(65) Prior Publication Data
US 2020/0393267 A1    Dec. 17, 2020

(51) Int. Cl.
*G01C 21/36* (2006.01)
*G06V 20/58* (2022.01)

(52) U.S. Cl.
CPC ..... *G01C 21/3632* (2013.01); *G01C 21/3641* (2013.01); *G06V 20/584* (2022.01)

(58) Field of Classification Search
CPC ........... G06K 9/00825; G06K 9/00791; G06K 9/6267; G01C 21/3632; G01C 21/3641
See application file for complete search history.

(56) References Cited

U.S. PATENT DOCUMENTS

| 7,026,956 | B1 | 4/2006 | Wenger |
| 7,649,444 | B1 | 1/2010 | Fear |
| 9,291,474 | B2 | 3/2016 | Basson |
| 9,360,337 | B2 | 6/2016 | Moshfeghi |
| 9,772,196 | B2 | 9/2017 | Abramson |
| 9,915,547 | B2 | 3/2018 | Yuan |
| 2014/0372020 | A1* | 12/2014 | Stein .................. G01C 21/3602 701/410 |
| 2016/0363647 | A1 | 12/2016 | Zeng |
| 2018/0253977 | A1 | 9/2018 | Oshida |

(Continued)

FOREIGN PATENT DOCUMENTS

| DE | 102010006828 A1 | 8/2011 |
| DE | 102016210254 A1 | 12/2016 |

OTHER PUBLICATIONS

"Accelerate change to smarter vehicles of the future with AI and IoT", Watson Internet of Things, Connected Vehicles—IBM Watson IoT | IBM, <ttps://www.ibm.com/internet-of-things/explore-iot/vehicles>, printed Apr. 18, 2019, 11 pages.

(Continued)

*Primary Examiner* — Kenneth J Malkowski
(74) *Attorney, Agent, or Firm* — Joseph P. Curcuru (57) ABSTRACT

Embodiments of the present invention describe identifying details of the area around a first vehicle and identifying a potential confusion point in a navigation route of the first vehicle. Additionally, embodiments of the present invention determining based on a threshold, whether to provide a driver of the first vehicle with a visual clue to assist with navigating through the identified potential confusion point, responsive to determining to provide a visual clue, identifying one or more visual clues from an area surrounding the first vehicle; and outputting the identified one or more visual clues to the driver.

14 Claims, 4 Drawing Sheets

(56) References Cited

U.S. PATENT DOCUMENTS

2019/0056237 A1* 2/2019 White .............. G08G 1/096833
2019/0179331 A1* 6/2019 Heo .................. G01C 21/3673

OTHER PUBLICATIONS

"How IBM and GM are using technology to revolutionize your driving experience", Business Insider, India, Dec. 16, 2016, <https://www.businessinsider.in/How-IBM-and-GM-are-using-technology-to-revolutionize-your-driving-experience/articleshow/56025066.cms>, 17 pages.

"IBM Integrates with BMW CarData to Enable New and Innovative Services for Drivers", IBM Newsroom, Jun. 14, 2017, <https://www-03.ibm.com/press/us/en/pressrelease/52595.wss>, 3 pages.

"Speed past your competition with insights from connected vehicles", Watson Internet of Things, <https://www.ibm.com/internet-of-things/solutions/iot-platform/vehicle-connectivity-and-analytic-insights>, printed Apr. 18, 2019, 9 pages.

Bogen et al., "Visual Navigation with Schematic Maps", Publ. in: Visual Information Communication / Mao Lin Huang ... (eds.) Heidelberg : Springer, 2009, pp. 65-84. 10.1007/978-1-4419-0312-9_4, <http://www.uni-konstanz.de/algo/publications/bbz-vnsm-09.pdf>.

Deward et al., "Visual map and instruction-based bicycle navigation: a comparison of effects on behaviour", Ergonomics, vol. 60, 2017, Issue 9, Published online: Jan. 31, 2017, <https://www.tandfonline.com/doi/full/10.1080/00140139.2017.1282628>, 39 pages.

Ramos et al., "Preference for Map Scale of In-Car Route Guidance and Navigation System", BCG—Boletim de Ciências Geodésicas—On-Line version, ISSN 1982-2170 http://dx.doi.org/10.1590/S1982-21702016000300027, pp. 472-491, jul-set, 2016.

* cited by examiner

FIG. 1

VISUAL CLUE IDENTIFICATION

VISUALLY GUIDING A VEHICLE

BACKGROUND OF THE INVENTION

The present invention relates generally to the field of global position system (GPS) navigation, and more particularly to guiding a vehicle with visual clues.

A GPS navigation device or simply GPS is a device that can receive information from GPS satellites and calculate the device's geographical position. GPS is a global navigation satellite system (GNSS). Using the GPS information and subject to the sophistication of installed GPS software, a GPS device can be used as a vehicle navigation system. A GPS device can be used in a number of contexts, including: maps, street maps, or any other maps known in the art. The maps are displayed in a readable format via text or in a graphical format or turn-by-turn navigation directions to the driver of the vehicle. A GPS can deliver directions directly to an autonomous vehicle, such as a robotic probe, and traffic congestion maps (depicting either historical or real time data). A GPS device can suggest alternative directions and information on nearby amenities such as restaurants, fueling stations, and tourist attractions. Additionally, GPS devices can indicate: the roads or paths available, traffic congestion and alternative routes, roads or paths that might be taken to get to the destination, if some roads are busy (now or historically) the best route to take, the location of food, banks, hotels, fuel, airports or other places of interests, the shortest route between the two locations, and options to drive on highways or back roads.

Turn-by-turn Navigation is a feature of some GPS navigation devices where directions for a selected route are continually presented to the user (i.e., driver) in the form of spoken or visual instructions. The GPS keeps the driver up-to-date on the best route to the destination, and is often updated according to changing factors, such as traffic and road conditions. Turn-by-turn systems typically use an electronic voice to inform the driver whether to turn left or right, the street name, and how much distance to the turn. Mathematically, turn by turn navigation is generally based on the shortest path problem within graph theory, which examines how to identify the path that best meets some criteria (shortest, cheapest, fastest, etc.) between two points in a large network.

SUMMARY

Embodiments of the present invention disclose a method, a computer program product, and a system for visually guiding a vehicle, comprising: identifying, by one or more processors, details of the area around a first vehicle; identifying, by the one or more processors, a confusion point in a navigation route of the first vehicle; determining, by the one or more processors, if a driver of the first vehicle requires a visual clue to assist with navigating through the identified confusion point; responsive to determining that the driver requires a visual clue, identifying one or more visual clues from the surrounding area or a second vehicle; and outputting, by the one or more processors, the identified one or more visual clues to the driver.

DETAILED DESCRIPTION

Currently, in vehicle navigation, there is a question as to when and how to suggest visual clues to a driver while driving a vehicle. A vehicle can be a car, a truck, a motorcycle or any form of motorized transportation known in the art. Currently, route navigation can cause confusion to the driver when there are several lanes connecting or branching from each other. For example, to take an overpass or not can be very confusing if one is just looking at a map. Furthermore, while existing systems may provide navigation in the form of text, audio, and visual guidance based on auto generated content in the form of signs, symbols, maps, etc, existing systems do not provide visual clues by referencing real-world objects (for example, instructing the driver to follow the red car in front of the driver). Some of the challenges with respect to the current state of the art include (1) identifying a point where it could be confusing for a human to follow a map, (2) taking privacy into account while suggesting a visual clue, and (3) identifying the best visual clue based on current position and surrounding traffic conditions such that it helps in navigation.

Embodiments of the present invention improve the art of GPS navigation by providing a solution to the challenges identified above by visually guiding a vehicle (V1) to take the correct path during one or more confusion points during map navigation. It should be noted that V1 can be the vehicle of the driver using a mobile GPS navigation application. A confusion point can occur when a driver is using a mobile GPS navigation application and confusion arises as to which street to turn on, which exit to take, etc. For example, a driver is using a mobile GPS navigation application on a smartphone and the driver is currently driving on a highway. In this particular example, the highway has a four way fork (three highway splits and one off-ramp exit) coming up in a few miles and there are several surrounding surface streets surrounding the highway creating confusion for the driver.

In the example, embodiments of the present invention can identify one or more other vehicles on the road and prioritize another vehicle (V2) within the view of V1, which is traveling the same path as V1 until the confusion point is crossed. The confusion point is determined to be crossed based on a predetermined threshold that determines the driver either has no or reduced confusion in following the path (e.g., the driver is beyond the confusion point). Additionally, embodiments of the present invention can notify the driver by providing some visual clues. For example, embodiments of the present invention can instruct the driver of V1 to follow the red car driving in front V1 in the left lane, or follow the red car which has license plate number ending with "89," etc. Embodiments of the present invention can identify a list of other vehicles in the field of view of the driver of V1 and create a ranking order/list of which vehicles are the more efficient for V1 to follow. For example, if the yellow vehicle is better visible and easier to follow, embodiments of the present invention will recommend the yellow vehicle. Embodiments of the present invention can output the list ranked vehicles and instruct the driver of V1 to follow the top ranking vehicle discovered for a prescribed time until the confusion point is successfully crossed.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the driver to opt-in or opt-out of participation. Similarly, in various embodiments, emails and texts begin with a written notification that the driver's information may be recorded or monitored and may be saved, for the purpose of crowdsourcing traffic and navigation data. These embodiments may also include periodic reminders of such recording and monitoring throughout the course of any such use. Certain embodiments may also include regular (e.g. daily, weekly, monthly) reminders to the participating parties that they have consented to being recorded and monitored for traffic monitoring and navigation purposes, and may provide the participating parties with the opportunity to opt-out of such recording and monitoring if desired. Furthermore, to the extent that any non-participating parties' actions are monitored (for example, when outside vehicles are viewed), such monitoring takes place for the limited purpose of providing navigation assistance to a participating party, with protections in place to prevent the unauthorized use or disclosure of any data for which an individual might have a certain expectation of privacy.

Implementation of embodiments of the invention may take a variety of forms, and exemplary implementation details are discussed subsequently with reference to the figures (i.e., FIG. 1-FIG.4).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Figure 1:
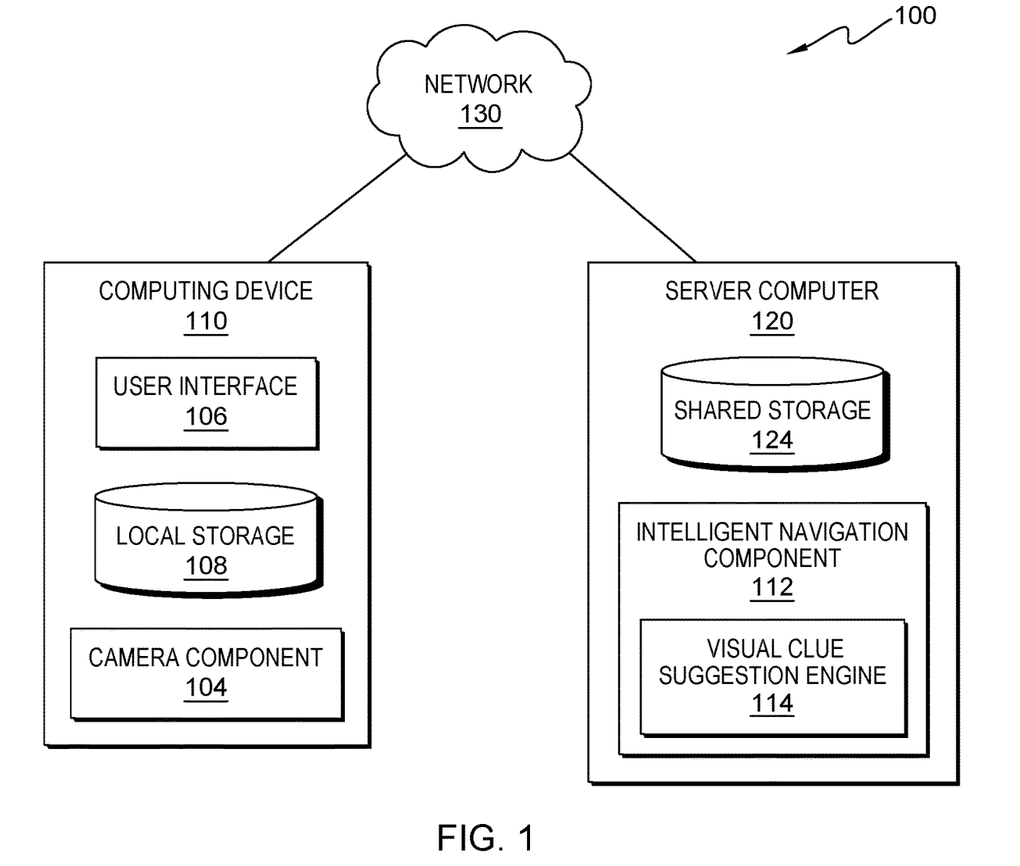
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, and server computer 120 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In various embodiments, network 130 can be a peer to peer (P2P) network. In general, network 130 can be any combination of connections and protocols that will support communications between computing device 110, intelligent navigation component (INC) 112, local storage 108, shared storage 124, server computer 120, any other computing devices or other storage devices (not shown in FIG. 1), or any combination therein within distributed data processing environment 100.

In various embodiments, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with drivers of other computing devices via network 130, capable of executing machine-readable program instructions and communicating with server computer 120.

In other embodiments, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. In the depicted embodiment, computing device 110 can include user interface (UI) 106, camera component 104, and local storage 108. In various embodiments, not depicted in FIG. 1, computing device 110 can have one or more user interfaces. In other embodiments, not depicted in FIG. 1, distributed data processing environment 100 can comprise one or more computing devices, one or more server computers, and/or one or more networks. In various embodiments, computing device 110 can be in or integrated with a motorized vehicle. Computing device 110 can include internal and external hardware components, as depicted, and described in further detail with respect to FIG. 4.

UI 106 provides an interface to INC 112 via network 130 for a driver (e.g., vehicle operator). UI 106 enables the vehicle operator to interact with computing device 110 or server computer 120. In various embodiments, UI 106 can enable a driver, a client, or both to interact with INC 112, computing device 110, server computer 120, or any combination thereof. For example, a computer system and display screen enabling a driver to send program instructions, receive program instructions, send messages, receive messages, update data, send data, input data, edit data, collect data, receive data, or any combination thereof from a server or a program. In one embodiment, UI 106 can be a graphical user interface (GUI) or a web user interface (WUI) and can display text, documents, web browser windows, driver options, application interfaces, and instructions for operation. UI 106 can include information such as graphic, text, and sound. UI 106 can enable a program to be presented to a driver and enable control sequences the driver employs to control the program. In another embodiment, UI 106 can be a mobile application software providing an interface between a user of computing device 110 and server computer 120. Mobile application software, or an "app," can be a computer program designed to run on smart phones, tablet computers and other computing devices. In an embodiment, UI 106 can enable the user of computing device 110 to send data, input data, edit data (annotations), collect data and/or receive data.

Camera component 104 can be any type of camera known in the art. In the depicted embodiment camera, component 104 resides on computing device 110. In other embodiments, camera component 104 can reside elsewhere within distributed data processing environment 100, provided that camera component 104 can access at least one of computing device 110 and server computer 120 and is accessible by at least one of computing device 110 and server computer 120.

Server computer 120 can be a standalone computing device, a management server, a web server, a mobile computing device, a central server, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 4.

Each of shared storage 124 and local storage 108 can be a data/knowledge repository and a database that can be written and read by one or a combination of INC 112, server computer 120, and computing device 110. In the depicted embodiment, shared storage 124 resides on server computer 120 and local storage 108 resides on computing device 110. In another embodiment, shared storage 124 and local storage 108 can each reside elsewhere within distributed data processing environment 100, provided that each can access at least one of computing device 110 and server computer 120 and each are accessible by at least one of computing device 110 and server computer 120. Shared storage 124 and local storage 108 can each be implemented with any type of storage device capable of storing data and configuration files that can be accessed and utilized by server computer 120, computing device 110, or any combination thereof, such as, but not limited to, a database server, a hard disk drive, or a flash memory. In other embodiments, shared storage 124 and local storage 108 can each be a hard drive, a memory card, a computer output to laser disc (cold storage), or any form of data storage known in the art. In some embodiments, shared storage 124 and local storage 108 can each be one or more cloud storage systems or databases linked to a cloud network.

In the depicted embodiment, INC 112 executes on server computer 120. In other embodiments, INC 112 can be on computing device 110, one or more computing devices 110 or one or more server computers 120 (not depicted in FIG. 1), or anywhere within distributed data processing environment 100, provided that INC 112 can access at least one of computing device 110 and server computer 120, and is accessible by at least one of computing device 110 and server computer 120. In some embodiments, INC 112 can be on one or more servers, one or more computing devices, or any combination thereof. In some embodiments, not depicted in FIG. 1, INC 112 can be a standalone component on computing device 110.

In various embodiments, INC 112 can visually guide a vehicle (V1) to take the correct path during one or more confusion points. In various embodiments, INC 112 can visually guide V1 by discovering and prioritizing another vehicle (V2) in front of or near V1, which is traveling the same path as V1, until the point of confusion is crossed. In various embodiments, INC 112 can correlate V1's GPS navigation path with the GPS details of nearby vehicles, via a central server, to filter a set of one or more vehicles having a same or similar path as V1 until V1 has crossed the confusion point. Additionally, in various embodiments, INC 112 can identify vehicles that have successfully crossed the confusion point as per V1 route and filter a recommendation list based on the identified vehicles.

In various embodiments, the GPS feeds (e.g., GPS details/navigation route) of the surrounding vehicles are not known or shared with the driver of V1. The GPS details (e.g., GPS navigation route) of other vehicles around V1 are only known to central server and not shared with the drivers, which resolves any privacy issue aspects. In various embodiments, the central server can maintain an association between one or more portions of a GPS navigation route and the vehicle associated with the one or more portions of the GPS navigation route. Additionally, in various embodiments, the central server can tag or place a unique identifier on the one or more portions of the GPS navigation route to associate the one or more portions of the GPS navigation route with the vehicle that is employing the GPS navigation route that the one or more portions of the GPS navigation route were retrieved from. For example, server computer 120 assigns a unique identifier to a portion of the GPS navigation route of V2 that associates V2 with the portion of the GPS navigation route. In this example, the unique identifier enables VCSE 114 to identify that V2 is traveling in the same direction for a predetermined amount of distance or time. In some embodiments, the central server assigns the GPS navigation route a unique identifier or tag when the GPS navigation route is generated by a driver.

In some embodiments, the central server can assign a unique token to a portion of a GPS navigation route for a vehicle that can be read and accessed by VCSE 114, in which the unique token comprises vehicle details of the vehicle associated with the portion of the GPS navigation route. In various embodiments, the unique identifier or tag can be based on GPS location, speed of the vehicle, IP address, a user identification code, a unique code or sequence, user data and vehicle data entered by the user, and/or any other unique identifier or tag data known in the art. In various embodiments, the unique identifier or tag can enable VCSE 114 to access vehicle details (e.g., make, model, and/or color of the vehicle, license plate, etc.) of the vehicle associated with the portion of the GPS navigation route. In various embodiments, VCSE 114 can retrieve a portion of GPS navigation route from one or more vehicles when a confusion point is detected and can identify which vehicle can be selected based on the retrieved portion of the GPS navigation and the ease of access for the driver of V1 to follow the vehicle.

In various embodiments, the vehicle suggestion is triggered during confusion points, or in other words, V1 will not know the full route of the vehicle that INC 112 recommends V1 to follow. In various embodiments, INC 112 can dynamically determine a vehicle to follow for a predetermined amount of time (e.g., 10 seconds) or a predetermined distance (e.g., 0.25 miles). In various embodiments, after the predetermined time has lapsed INC 112 doesn't guarantee that both vehicles will follow the same navigation route. In the depicted embodiment, INC 122 can comprise a visual clue suggestion engine (VCSE) 114. In other embodiments, VCSE 114 can be located anywhere in distributed data processing environment 100 as long as VCSE 114 is in communication with at least one of computing device 110, INC 112, and/or server computer 120.

In various embodiments, INC 112 can receive and retrieve one or more GPS locations, current traffic information, popular or historic landmarks on the navigation route, target destination, and a real-time video feed of the area surrounding V1, via camera component 104, to determine details of the surrounding area. In this particular embodiment, VCSE 114 processes the GPS information, current traffic information presented in the mobile GPS navigation application, the target destination, and the live camera feed, in which VCSE 114 can output an identified point for visual clue suggestion, in which the identified point for visual clue suggestion is a suggested visual clue presented to the driver of V1 for ease of vehicle navigation. For example, there is a confusion point arriving in 0.25 miles and VCSE 114 identifies two vehicles, a red hatchback and a blue minivan traveling in the same general direction as V1 for the next mile. In this example, VCSE 114 will analyze the live feed video and the traffic information to determine which vehicle V1 should follow. In this example, VCSE 114, via video analysis of the live feed from camera component 104, identifies that the red hatchback is in the far right lane four cars ahead of V1 and that the blue minivan is in right lane next to V1 and only one car ahead of V1. In this example, VCSE 114 determines the blue minivan is easier and more visible for V1 to follow because it is right next to V1 and easily visible to the driver of V1. In this example, INC 112, via VCSE 114, outputs visual clues based on the blue minivan to the driver of V1 and instructions for the driver of V1 to follow the blue minivan.

In another example, VCSE determines there is confusion point for V1 approaching in 0.5 miles. In this example, VCSE 114 retrieves a portion of navigation routes from vehicles surrounding V1 from a central server (e.g., server computer 120). In this example, based on the retrieved portion of the navigation routes, VCSE 114 identifies that a silver pickup truck in front of V1 in the left lane is generally taking the same route as V1 for the next mile. In this example, VCSE 114 recommends that the driver of V1 follow the silver pick-up truck for the next 0.5 miles until V1 passes the determined confusion point.

In various embodiments, VCSE 114 identifies one or more points for visual clue suggestion by analyzing one or more vehicle details, the driver's details, surrounding information collected, via video stream from camera component 104, and current navigation suggestions from a mobile GPS navigation application (e.g., a current navigation route). Vehicle details can be, but are not limited to, type of vehicle (e.g., make, model, and color of the vehicle), current speed of the vehicle, direction the vehicle is traveling, current lane the vehicle is in, license plate, etc. Driver details can be, but are not limited to, a driver's skill, age of the driver, and history of driving experience. Current navigation suggestions can be, but are not limited to, upcoming directions from the mobile GPS navigation application. In various embodiments, INC 112 can identify and/or determine if a visual clue is required (or likely to be required), via Classifier 1 described below.

In various embodiments, INC 112 can identify whether or not a visual clue suggestion is needed (or likely to be needed) at time (t) based on Classifier 1:

$$f_{visual\ Clue}^{classifier}(f_{1\ldots k}^{vehicle}, f_{1\ldots l}^{driver}, f_{1\ldots m}^{live\text{-}stream}, f_{1\ldots n}^{current\ navigation}) \quad \text{Classifier 1}$$

wherein, represents the captured details of the vehicle the driver is driving (i.e., V1) at different moments in time during V1's navigation route; $f_{1\ldots l}^{driver}$ represents the captured details of the driver of V1; $f_{1\ldots m}^{live\text{-}stream}$ represents the captured details of the current surrounding area through video feed; and $f_{1\ldots n}^{current\ navigation}$ represents the captured details of the current navigation suggestions and trip information. In various embodiments, Classifier 1 can generate a binary output at time (t) to identify whether the driver of V1 needs (or would benefit from) a visual clue at a particular point in time, in which a binary output can be one or more ones and/or one or more zeros. In various embodiments the output of 1 from the classifier would indicate a visual clue is required and an output of 0 would indicate no visual clue is required by using a simple step function as the activation function for the classifier to the binary output of Classifier 1. For example, if a weighted output from the classifier is greater than 0.5, a step function can map the classifier to +1, otherwise the step function outputs 0. In other embodiments, other activation functions can be used in classifiers (e.g., sigmoid, hyperbolic tangent (tanh), rectified linear unit (ReLU)). In some embodiments, Classifier 1 can be a decision tree classifier, a Naive Bayes classifier, an artificial neural network classifier, k-Nearest Neighbor classifier, or any other classifier known in the art.

In various embodiments, VCSE 114, via Classifier 1, can determine if the driver of V1 requires (or could benefit from) a visual clue when a confusion point is identified. For example, $f_{1\ldots k}^{vehicle}$ is a 2012 red four door sedan with 80,000 miles traveling at 60 miles per hour (mph), $f_{1\ldots l}^{driver}$ is a 70 year old man that wears corrective lenses, $f_{1\ldots m}^{live\text{-}stream}$ is a live feed of the current highway that the driver of V1 is on, and $f_{1\ldots n}^{current\ navigation}$ is the current navigation route (i.e., directions) that the driver of V1 is following along with traffic conditions. In this example, VCSE 114 retrieves the vehicle details of V1, the live video stream details, the current navigation, and the driver's details from local storage 108. In this example, VCSE 114 identifies that the highway is forking in 2 miles, it is dark out (e.g., low visibility), and that the driver is driving in the far right lane, however the driver needs to be in one of left two lanes on the five lane highway. In this example, based on the retrieved data, VCSE 114 would determine, via Classifier 1, that the driver will need a visual clue. In various embodiments, VCSE 114 can continuously check for visual clue recommendation when one or more confusion points is identified. In various embodiments, if one or more confusion points are not detected, VCSE 114 does not need to output visual clue. However, if INC 112 determines there are one or more confusion points in the current navigation suggestion, then VCSE 114 can identify one or more visual clues for the driver of V1. In various embodiments, based on the video-feed semantic analysis or the video live feed, INC 112 can identify one or more vehicles from the filtered list that is easy for the driver to follow visually.

In various embodiments, INC 112 can identify and prioritize a set of vehicles for visual clues. In various embodiments, INC 112 can prioritize a set of vehicles based on the GPS information of the other vehicles around the driver of V1. In various embodiments, the GPS information can be shared privately through a mobile GPS navigation application (e.g., a central server) and/or through crowdsourced GPS information. In some embodiments, INC 112 can access a central server for mobile GPS navigation to determine the navigation route of other vehicles within a predetermined range of V1. For example, INC 112 can identify the route overlap of one or more vehicles around V1 and can identify one or more vehicles that are suitable for visual clues (e.g., are traveling in same general direction as V1 even if the other vehicle is only traveling in the same direction as V1 until V1 passes the point of confusion). In various embodiments, INC 112 can filter out vehicles based on GPS information. For example, if INC 112 determines a red and silver vehicle's navigation route is taking the next exit and a blue vehicle is staying on the highway similar to V1's navigation route, then INC 112 can filter out the red and silver car and recommend the driver follow the blue car.

In various embodiments, when there are no GPS feeds from the surrounding cars available, INC 112 analyzes the captured video feed from camera component 104 and determines which cars crossed the confusion points through visual frame analysis and can identify a car to follow. Captured video can be a live video feed from camera component 104. In various embodiments, INC 112 can filter vehicles by predicting the GPS information of other vehicles around V1. In various embodiments, INC 112 can identify a vehicle for visual clues by inferring the GPS information of the vehicles in the field of view of V1 (e.g., vehicles displayed in the live video feed by camera component 104). In various embodiments, vehicles can be detected by training an object detection classifier that takes the image as an input and identifies the location of the vehicle in the image. In various embodiments, based on the location of the vehicles, viewing angle, location of the current GPS information, INC 112 can predict the GPS locations of one or more identified vehicles.

In various embodiments, INC 112 can predict a confusion score using Classifier 2. In various embodiments, INC 112 can use the pre-trained object detection classifier. In various embodiments, INC 112 can receive an image as an input and return (i.e., output) the location of one or more objects (e.g., vehicles). In various embodiments, one or more classifiers can be trained. A classifier can be trained using Classifier 2, which outputs a confusion score. The confusion score can be a binary output comprising one or more ones and/or one or more zeros. In various embodiments, a confusion score can vary between 0 and 1. For example, 0.87 is a high confusion score, and 0.23 represents a low confusion score. In various embodiments, INC 112 can rank the confusion scores from lowest to highest, in which the lowest confusion score represents a vehicle that is the easiest for the driver to follow and will be used as a visual clue.

$$f_{confusionScore}{}^{classifier}(I(O), Speed, S, \theta, Vs, Loc, R) \quad \text{Classifier 2}$$

Classifier 2 inputs comprise: location of object and the image (I(O)), predicted speed of the vehicle (Speed), scale of the object (S), current viewing angle ($\theta$), vehicle visibility score (Vs), current location information (Loc), route navigation information (R). In various embodiments, the vehicle that yields a low confusion score will be considered for the targeted vehicle to follow for visual clue. In various embodiments, INC 112 can select the vehicle with the lowest confusion score for the driver of V1 to follow. The visual description used for the visual clue is generated based on the vehicle's features such as, but not limited to, color, vehicle model, vehicle make, vehicle number, etc., along with distance information of some contextual information. For example, INC 112 will instruct the driver to follow red hatchback A6 with license plate number US1234 for 200 meters or follow hatchback A6 for the next 1 minute, via audio output. Visual clue output can be output to a driver visually, through audio output, textual output, and/or any other output known in the art. In some embodiments, Classifier 2 can a decision tree classifier, a Naïve Bayes classifier, an artificial neural network classifier, k-Nearest Neighbor classifier, or any other classifier known in the art.

In various embodiments, VCSE 114 can output a visual clue to the driver of V1 by taking an image from the live feed, via camera component 104, and identifying the position of other vehicles. In various embodiments, VCSE 114 can identify one or more vehicle positions and identify the viewing angle of the identified vehicles in order to provide context to one or more visual clues. In various embodiments, VCSE 114 can determine one or more confusion scores with respect to each of the identified vehicles and the time or distance the driver of V1 is instructed to follow V2. In some embodiments, VCSE 114 can prioritize the confusion score to identify the vehicle that can be used for a visual clue. In some embodiments, the vehicle that has the lowest confusion score of the one or more identified surrounding vehicles represents the easiest vehicle for the driver of V1 to follow and can be selected by VCSE 114 for the driver of V1 to follow. In various embodiments, VCSE 114 can generate one or more visual clue details such that driver privacy is kept confidential and helps in improving driver experience while interacting with visual navigation clues while driving the vehicle.

In various embodiments, via video frame analysis, INC 112 can identify unique aspects to disambiguate one or more vehicles from other vehicles in view of V1 to clearly identify one or more vehicles. In various embodiments, INC 112 tries to identify as minimal information as possible to disambiguate the one or more vehicles. For example, if INC 112 determines the driver of V1 should follow a red car in the front of V1 in the right lane and if there is only one red car in front of the right lane, then color is used as disambiguation parameter. However, in this example, if there are 2 red cars in front of V1, then the car make or car model name, and/or license plate will also be used for disambiguation. In various embodiments, INC 112 can output one or more visual clues and a predetermined time or distance for V1 to follow V2.

For example, INC 112 outputs a visual clue instructing the driver of V1 to "follow the red truck in front of you for 300 meters" or "follow the blue sedan model A1 on your left for 20 seconds." In various embodiments, the predetermined time or distance allotted to V1 to follow V2 can be determined by INC 112, via VCSE 114, and can be based on how long it will take the driver to pass the identified confusion point. In other embodiments, the time allotted to the driver of V1 can be predetermined.

Figure 2:
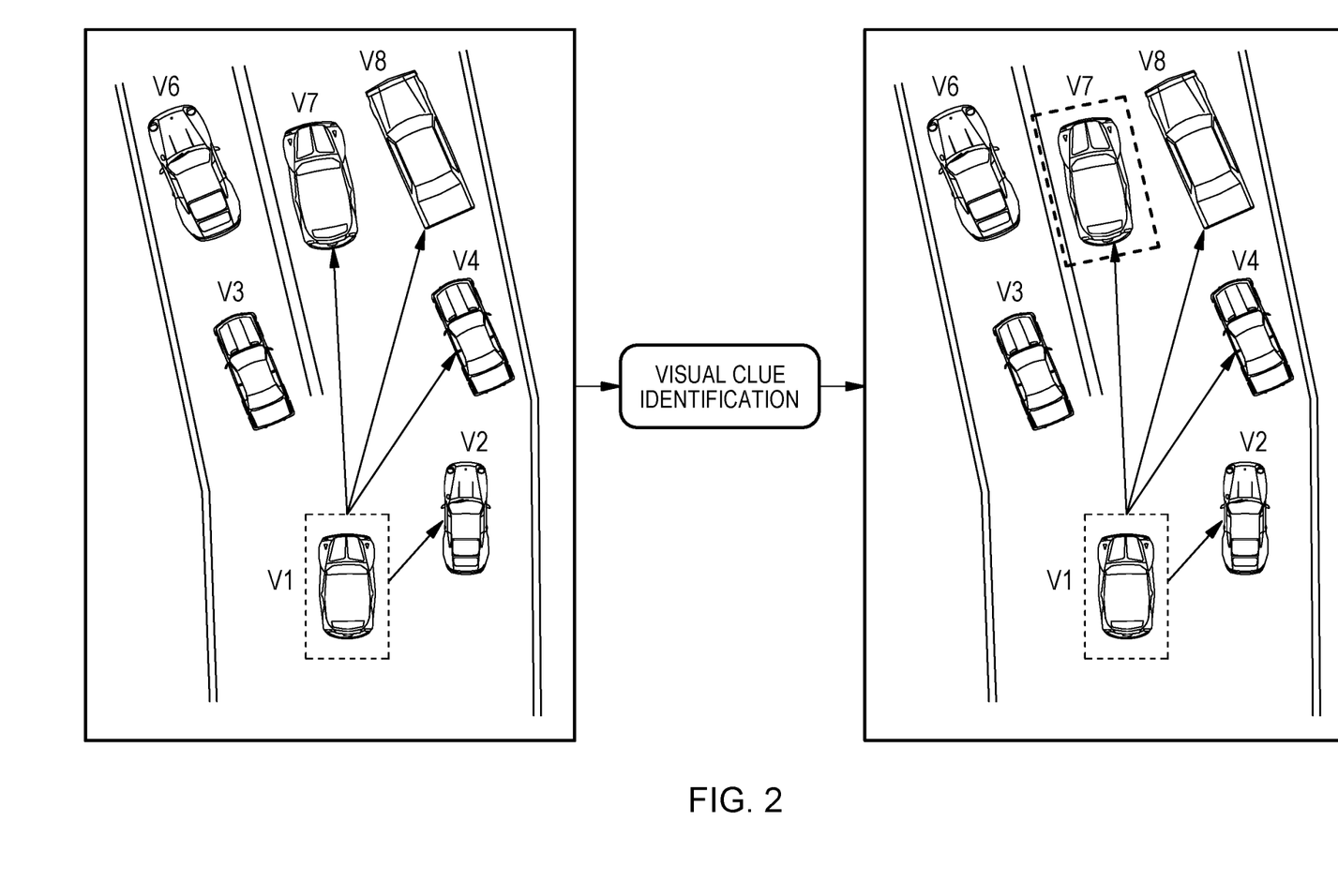
FIG. 2 is an example of intelligent navigation component within the distributed data procession environment of FIG. 1, in accordance with one example of the present invention.

In another example depicted in FIG. 2, the driver of V1 is on a three lane highway and the left lane is forking off in a different direction. In this example, there are seven vehicles in the field of view of the driver of V1 (e.g., V2 through V7). In this example, VCSE 114 determines there is a confusion point ahead and that vehicle 7 (V7) is headed in the same general direction as V1. In this example, V7 is in the clearest view of V1; therefore, VCSE 114 prompts the driver of V1 to follow vehicle 7 (V7) for the next quarter mile.

Figure 3:
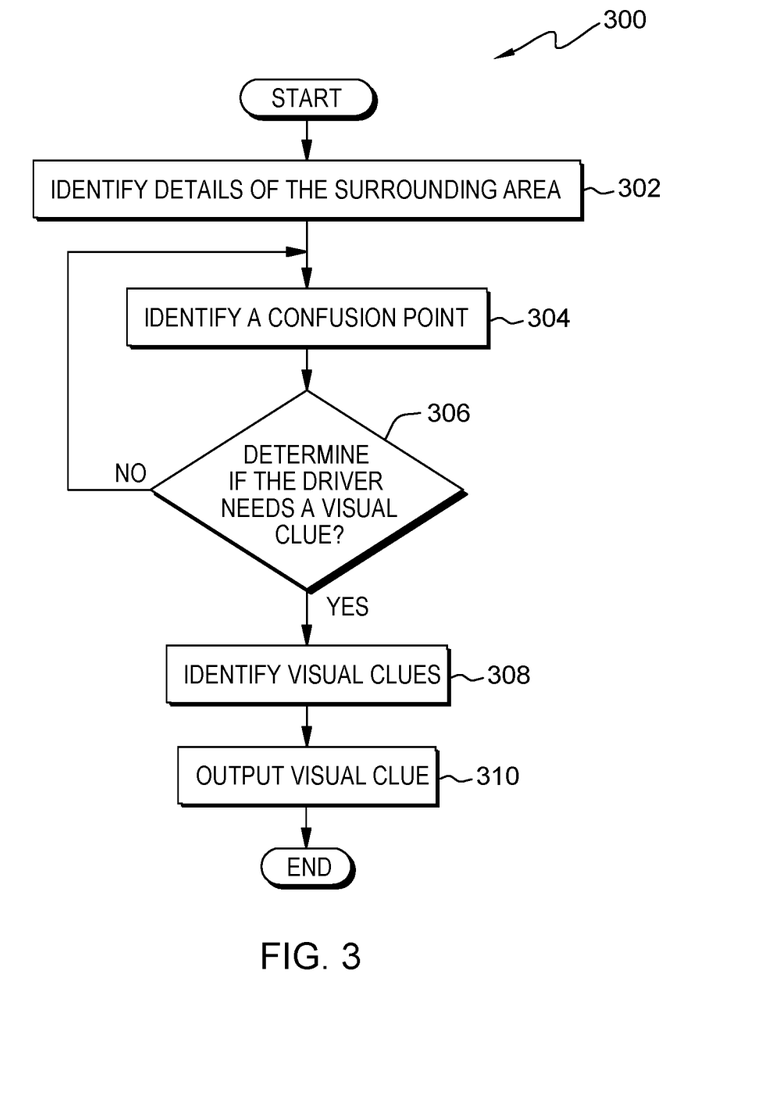
FIG. 3 illustrates operational steps of the intelligent navigation component, in communication with a server computer within the distributed data processing environment of FIG. 1, for visually guiding a vehicle, in accordance with an embodiment of the present invention.

FIG. 3 illustrates operational steps of INC 112, generally designated 300, on server computer 120 within distributed data processing environment 100 of FIG. 1 for visually guiding a vehicle, in accordance with an embodiment of the present invention. FIG. 3 provides an illustration of one implementation and does not imply any limitations with regard to the environments in which different embodiments can be implemented. Many modifications to the depicted environment can be made by those skilled in the art without departing from the scope of the invention as recited by the claims.

In step 302, INC 112 identifies details of the surrounding area. In various embodiments, INC 112 can receive a live feed of the surrounding area, via camera component 104. In various embodiments the live feed from camera component 104 can encompass the field of view of the driver of V1. In various embodiments, INC 112 can identify one or more details in the surrounding area based on the received live feed.

In step 304, INC 112 identifies a confusion point. In various embodiments, INC 112 can identify one or more confusion points on a navigation route based on the identified details in step 302.

In decision 306, INC 112 determines if the driver needs a visual clue. In various embodiments, INC 112 can determine if the driver of V1 needs a visual clue, via Classifier 1. In the depicted embodiment, if INC 112 determines that the driver of V1 requires a visual clue to help clarify the identified one or more confusion points in the navigation route (Yes branch) then INC 112 can execute step 308. In the depicted embodiment, if INC 112 determines that the driver of V1 does not require a visual clue to help clarify the identified one or more confusion points in the navigation route (No branch) then INC 112 can continue to monitor for confusion points and continuously check to see if the driver of V1 requires a visual clue.

In step 308, INC 112 identifies visual clues. In various embodiments, INC 112 can identify one or more visual clues based on a vehicle's description in the field of view of V1, via Classifier 2. In various embodiments, INC 112 can identify as little detail in a visual clue as need to clearly identify the vehicle (e.g., V2) that the driver of V1 is recommended to follow.

In step 310, INC 112 outputs visual clue. In various embodiments, INC 112 can output one or more visual clues to the driver of V1.

Figure 4:
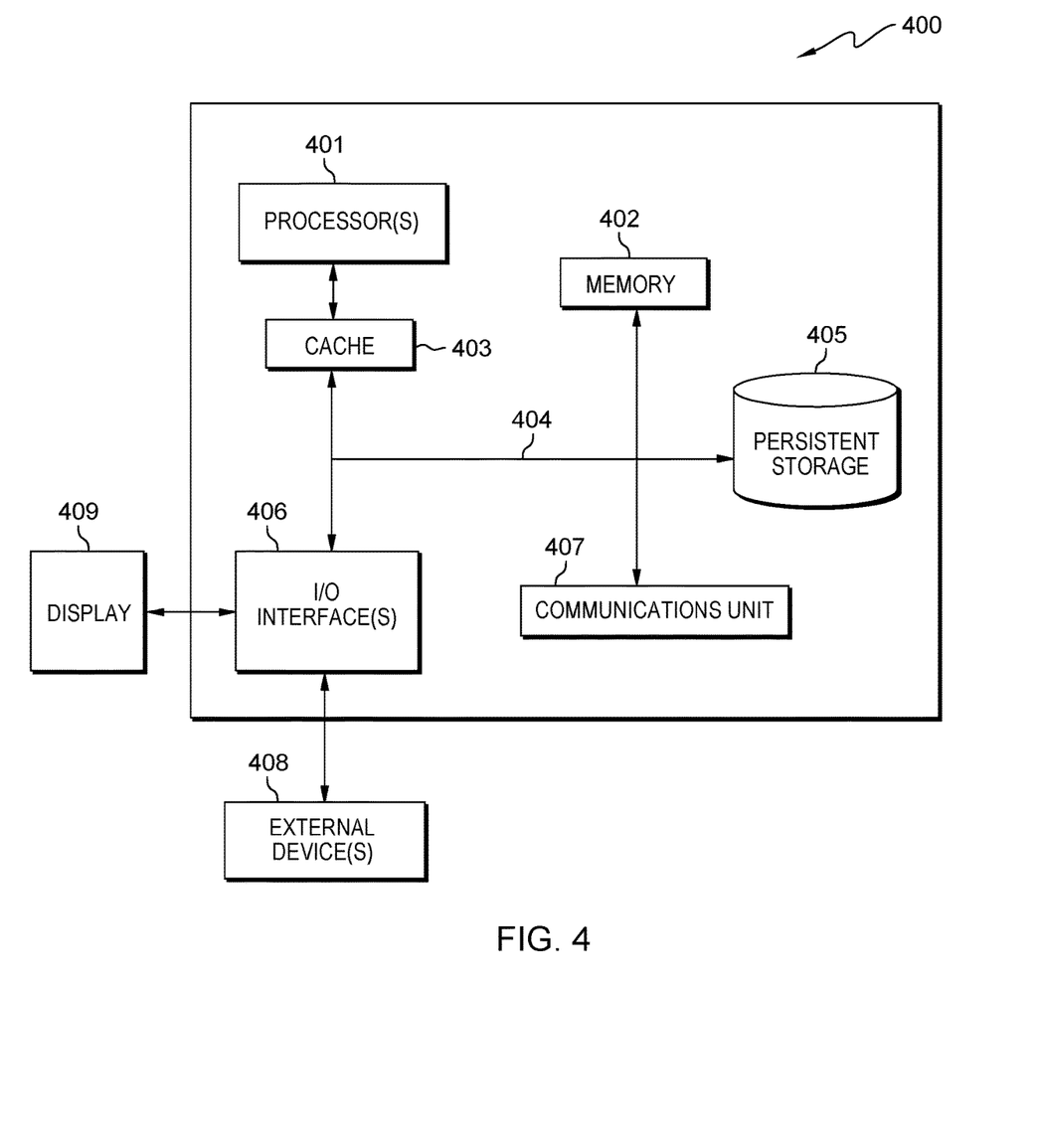
FIG. 4 depicts a block diagram of components of the server computer executing the intelligent navigation component within the distributed data processing environment of FIG. 1, in accordance with an embodiment of the present invention.

FIG. 4 depicts a block diagram of components of server computer 120 and computing device 110, generally designated 400, within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

FIG. 4 depicts computer system 400, where server computer 120 represents an example of computer system 400 that includes INC 112. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention can be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 can also be removable. For example, a removable hard drive can be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 can provide communications through the use of either or both physical and wireless communications links. Program instructions and data used to practice embodiments of the present invention can be downloaded to persistent storage 405 through communications unit 407.

I/O interface(s) 406 enables for input and output of data with other devices that can be connected to each computer system. For example, I/O interface 406 can provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a driver and can be, for example, a computer monitor.

What is claimed is:

1. A method for guiding a vehicle; with visual clues, the method comprising:
  identifying, by one or more processors, details of an area surrounding a first vehicle;
  identifying, by the one or more processors, a confusion point in a navigation route of the first vehicle, wherein the confusion point is a point in the navigation route with a plurality of divergences from the navigation route;

identifying, by the one or more processors, a plurality of vehicles that are traveling on at least a portion of the same navigation path as the first vehicle and that have crossed the identified confusion point;

outputting, by the one or more processors, a list of secondary vehicles comprising the identified plurality of vehicles;

correlating, by a central server, a global positioning system navigation path of the first vehicle with a global positioning system of a second vehicle, from the list of secondary vehicles, having a similar navigation path as the first vehicle and the second vehicle being within a predetermined range of the first vehicle, wherein the correlation ends after the first vehicle crosses the confusion point;

selecting, by the one or more processors, the second vehicle for the driver of the first vehicle to follow;

identifying, by the one or more processors, visual clues from the area surrounding the first vehicle wherein the visual clues include one or more unique aspects to disambiguate the second vehicle from other vehicles;

determining to provide the identified visual clues to the first vehicle based on a predetermined threshold:

outputting, by the one or more processors, the identified visual clues to the driver.

2. The method of claim 1, wherein selecting the second vehicle for the driver of the first vehicle to follow is based on calculating, by the one or more processors, a confusion score for the list of secondary vehicles.

3. The method of claim 2 wherein selecting the second vehicle for the driver of the first vehicle to follow is based on:
ranking, by the one or more processors, the confusion score of the list of secondary vehicles;
wherein the selecting of the second vehicles is further based on determining
a vehicle with the lowest confusion score for the driver of the first vehicle to follow.

4. The method of claim 3, further comprising: identifying, by the one or more processors, visual clues based on the selected second vehicle's description.

5. The method of claim 1, wherein outputting the visual clues comprises instructing the driver of the first vehicle to follow the visual clues for a predetermined time or distance, wherein the identified visual clues comprise the color and license plate number of the second vehicle.

6. A computer program product for guiding a vehicle with visual clues, the computer program product comprising:
one or more computer readable storage devices and program instructions stored on the one or more computer readable storage devices, the stored program instructions comprising:
program instructions to identify details of an area around a first vehicle;
program instructions to identify a confusion point in a navigation route of the first vehicle, wherein the confusion point is a point in the navigation route with a plurality of divergences from the navigation route;
identifying, by the one or more processors, a plurality of vehicles that are traveling on at least a portion of the same navigation path as the first vehicle and that have crossed the identified confusion point;
outputting, by the one or more processors, a list of secondary vehicles comprising the identified plurality of vehicles;
correlating, by a central server, a global positioning system navigation path of the first vehicle with a global positioning system of a second vehicle, from the list of secondary vehicles, having a similar navigation path as the first vehicle and the second vehicle being within a predetermined range of the is vehicle, wherein the correlation ends after the first vehicle crosses the confusion point;
selecting, by the one or more processors, the second vehicle for the driver of the first vehicle to follow;
identifying, by the one or more processors, visual clues from the area surrounding the first vehicle wherein the visual clues include one or more unique aspects to disambiguate the second vehicle from other vehicles;
determining to provide the identified visual clues to the first vehicle based on predetermined threshold:
program instructions to output the identified visual clues to the driver.

7. The computer program product of claim 6 wherein selecting the second vehicle for the driver of the first vehicle to follow is based on program instructions to calculate a confusion score for the list of secondary vehicles.

8. The computer program product of claim 7 wherein selecting the second vehicles for the driver of the first vehicle to follow is based on:
program instructions to rank the confusion score of the list of secondary vehicles;
wherein the selecting of the second vehicle is further based on determining a vehicle with the lowest confusion score for the driver of the first vehicle to follow.

9. The computer program product of claim 8, further comprising: program instructions to identify visual clues based on the selected second vehicle's description.

10. The computer program product of claim 6, wherein outputting the visual clues comprises instructing the driver of the first vehicle to follow the visual clues for a predetermined time or distance, wherein the identified visual clues comprise the color and license plate number of the second vehicle.

11. A computer system for guiding a vehicle with visual clues, the computer system comprising:
one or more computer processors;
one or more computer readable storage devices;
program instructions stored on the one or more computer readable storage devices for execution by at least one of the one or more computer processors, the stored program instructions comprising:
program instructions to identify details of an area around a first vehicle;
program instructions to identify a confusion point in a navigation route of the first vehicle, wherein the confusion point is a point in the navigation route with a plurality of divergences from the navigation route;
identifying, by the one or more processors, a plurality of vehicles that are traveling on at least a portion of the same navigation path as the first vehicle and that have crossed the identified confusion point;
outputting, by the one or more processors, a list of secondary vehicles comprising the identified plurality of vehicles;
correlating, by a central server, a global positioning system navigation path of the first vehicle with a global positioning system of a second vehicle, from the list of secondary vehicles, having a similar navigation path as the first vehicle and the second vehicle being within a predetermined range of the first vehicle, wherein the correlation ends after the first vehicle crosses the confusion point;

selecting, by the one or more processor, the second vehicle for the driver of the first vehicle to follow;

identifying, by the one or more processors, visual clues from the area surrounding the first vehicle wherein the visual clues include one or more unique aspects to disambiguate the second vehicle from other vehicles;

determining to provide the identified visual clues to the first vehicle based on a predetermined threshold:

program instructions to output the identified visual clues to the driver.

12. The computer system of claim 11 wherein selecting the second vehicle for the driver of the first vehicle to follow is based on program instructions to calculate a confusion score for the list of secondary vehicles.

13. The computer system of claim 12 wherein selecting the second vehicle for the driver of the first vehicle to follow is based on:

program instructions to rank the confusion score of the list of secondary vehicles;

wherein the selecting of the second vehicle is further based on determining a vehicle with the lowest confusion score for the driver of the first vehicle to follow; and program instructions to identify visual clues based on the selected second vehicle's description.

14. The computer system of claim 11, wherein outputting the visual clues comprises instructing the driver of the first vehicle to follow the visual clues for a predetermined time or distance, wherein the identified visual clues comprise the color and license plate number of the second vehicle.

* * * * *